R. H. PROPER.
ICE CREAM CONE DISPENSING MACHINE.
APPLICATION FILED OCT. 8, 1917.
1,289,907.
Patented Dec. 31, 1918.
7 SHEETS—SHEET 2.
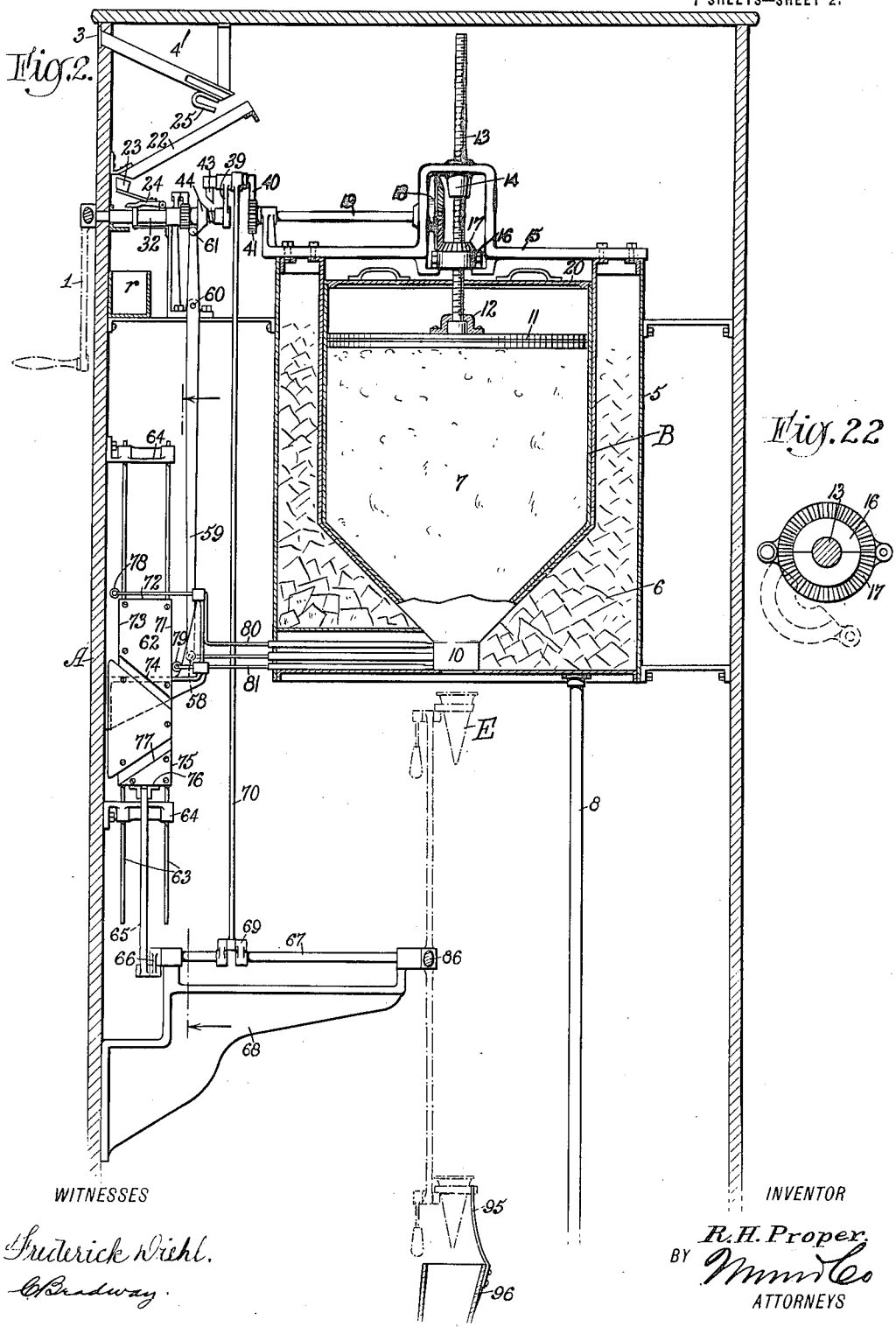
WITNESSES
Frederick Diehl.
C. Bradway.
INVENTOR
R. H. Proper,
BY Munn & Co
ATTORNEYS R. H. PROPER.
ICE CREAM CONE DISPENSING MACHINE.
APPLICATION FILED OCT. 8, 1917.
1,289,907.
Patented Dec. 31, 1918.
7 SHEETS—SHEET 3.
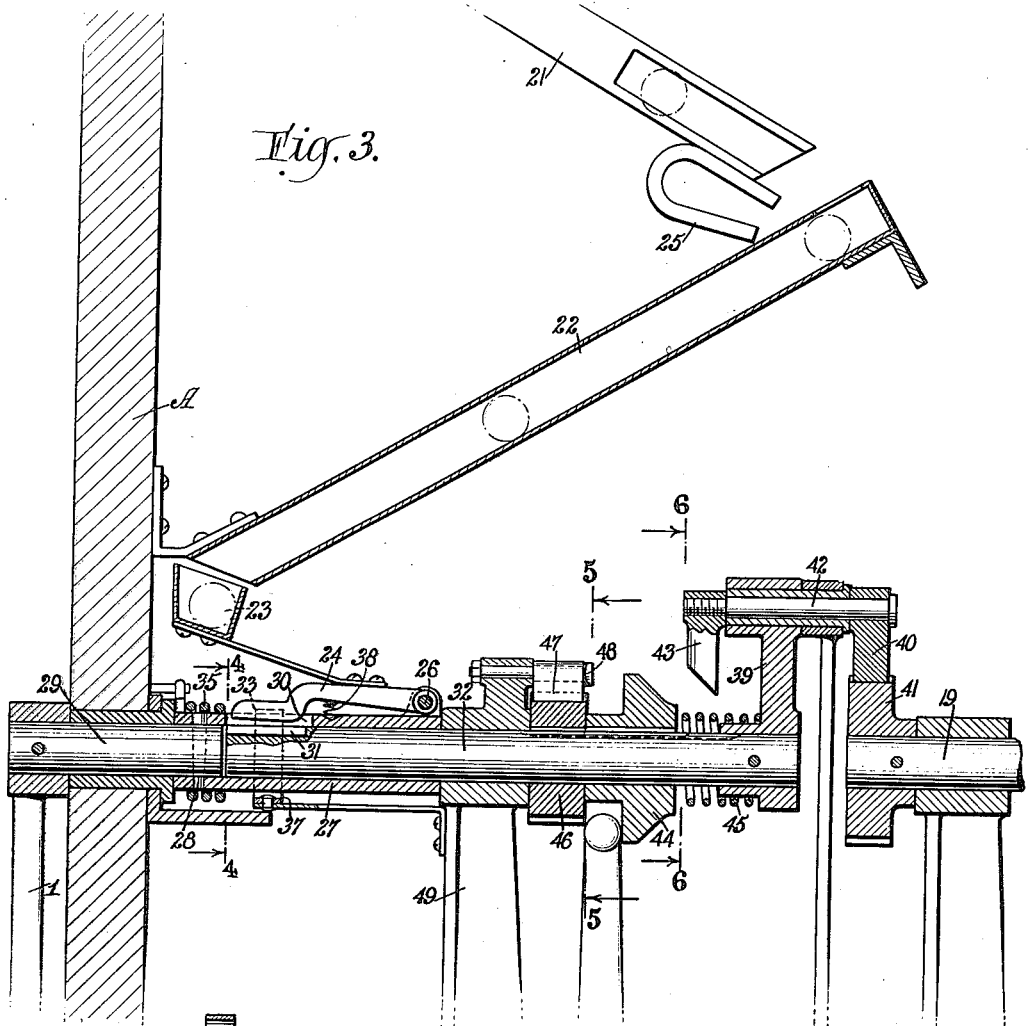
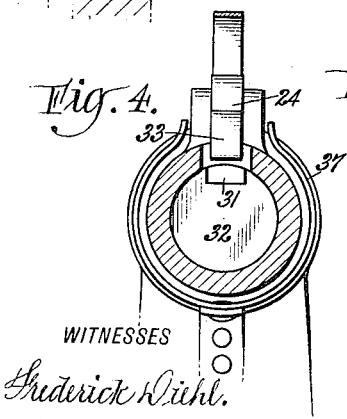
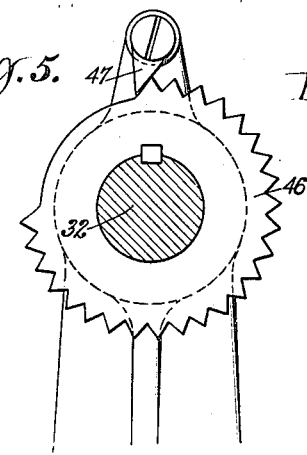
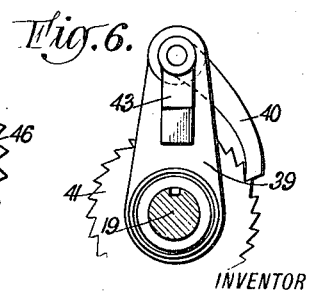
WITNESSES
Frederick Diehl.
C. Bradway
INVENTOR
R. H. Proper.
BY R. H. PROPER.
ICE CREAM CONE DISPENSING MACHINE.
APPLICATION FILED OCT. 8, 1917.
1,289,907.
Patented Dec. 31, 1918.
7 SHEETS—SHEET 4.
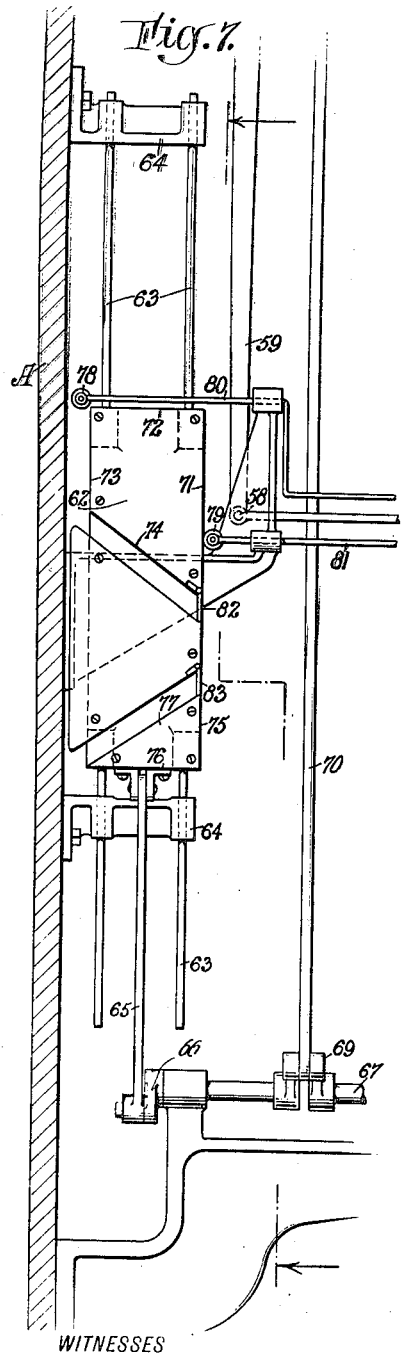
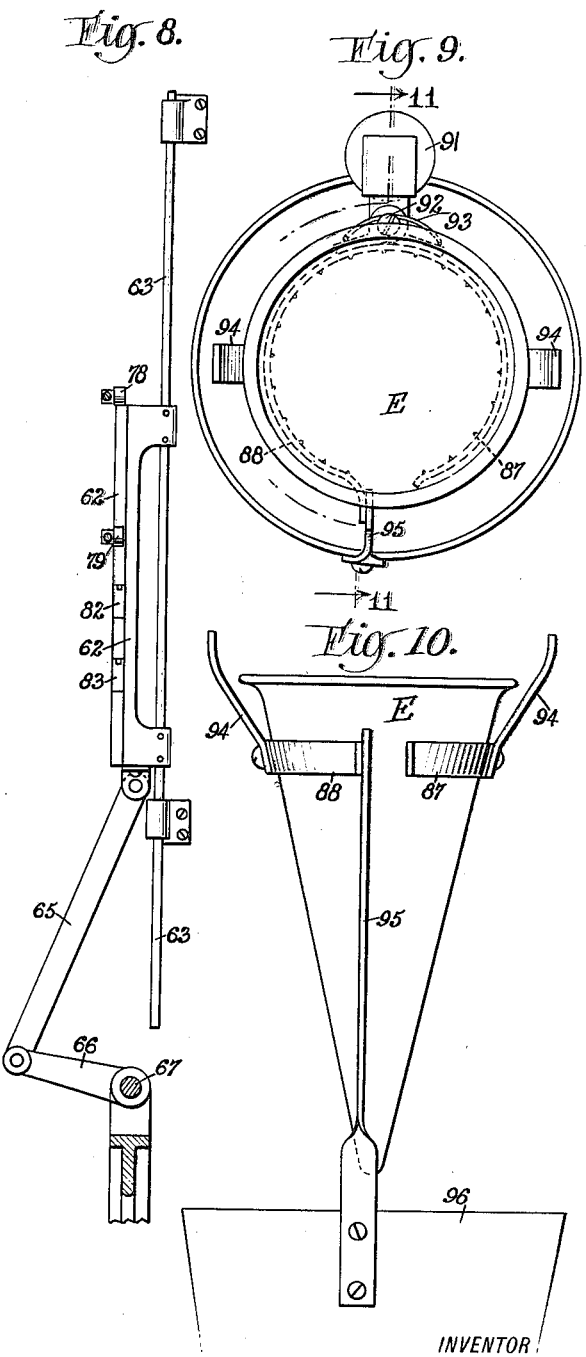

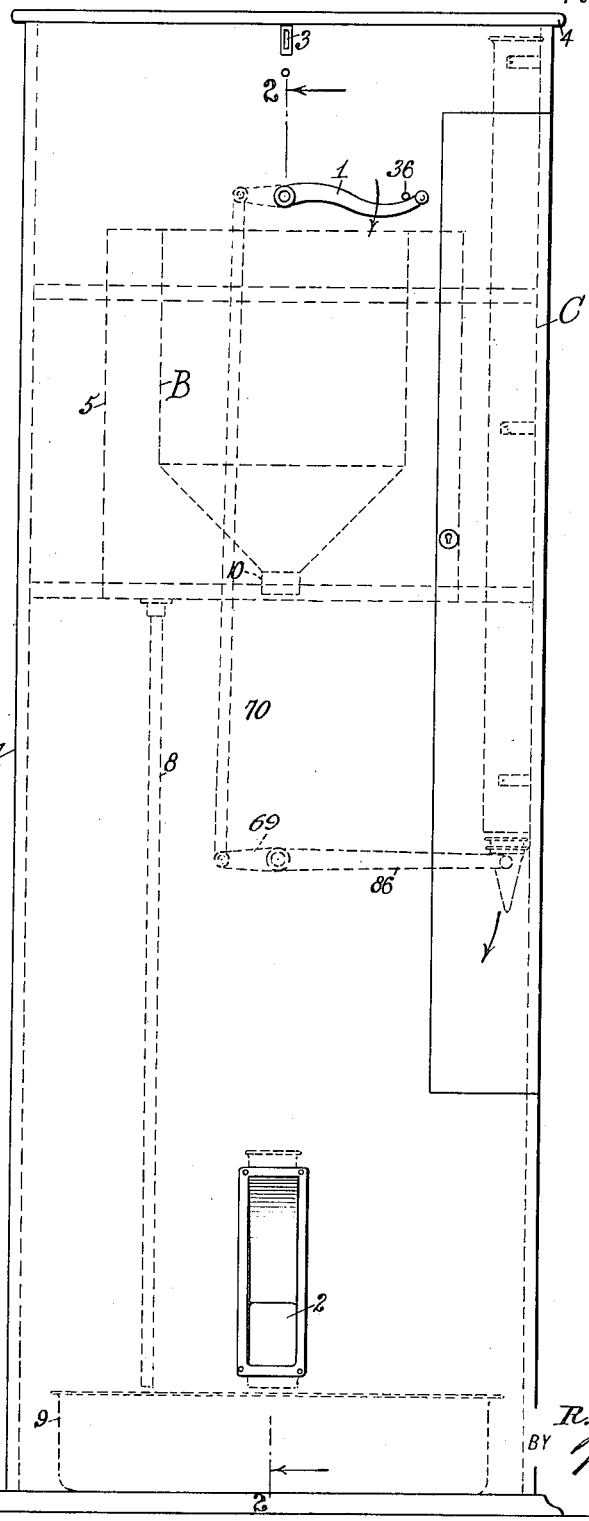

R. H. PROPER.
ICE CREAM CONE DISPENSING MACHINE.
APPLICATION FILED OCT. 8, 1917.
1,289,907.
Patented Dec. 31, 1918.
7 SHEETS—SHEET 5.
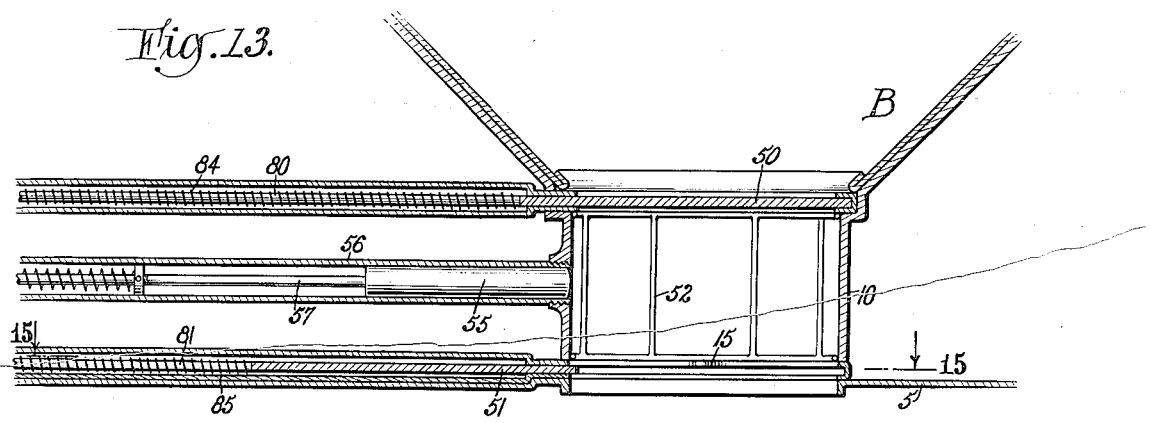
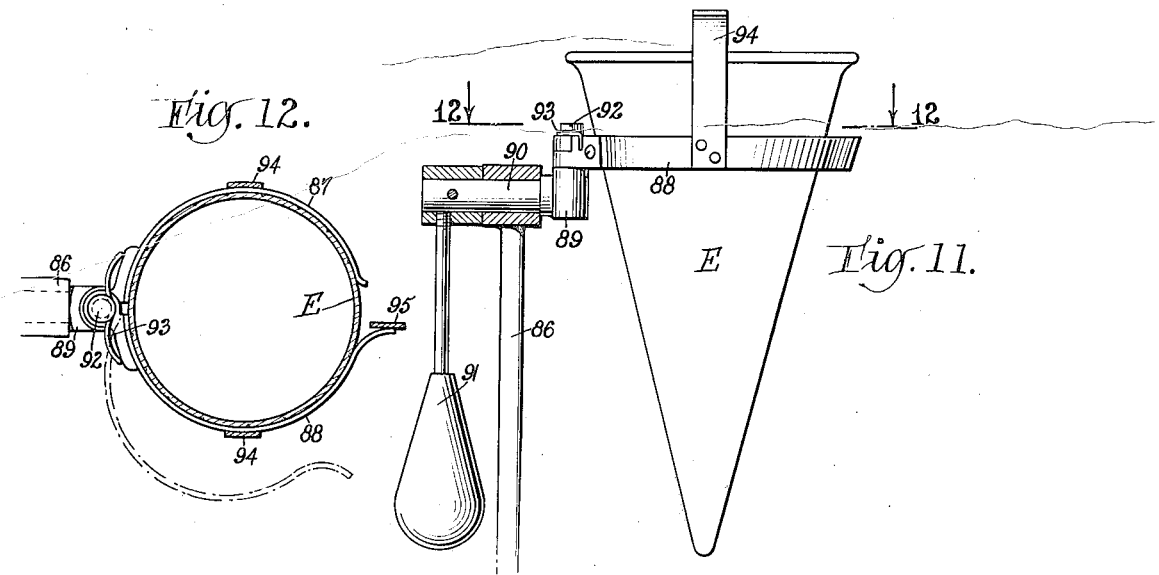
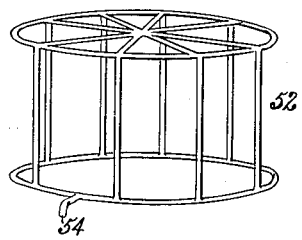
WITNESSES
Frederick Diehl.
C. Bradway
INVENTOR
R. H. Proper
BY
ATTORNEYS

R. H. PROPER.
ICE CREAM CONE DISPENSING MACHINE.
APPLICATION FILED OCT. 8, 1917.

1,289,907.

Patented Dec. 31, 1918.
7 SHEETS—SHEET 6.

WITNESSES
Frederick Diehl.
C. Bradway

INVENTOR
R. H. Proper.
BY
ATTORNEYS

R. H. PROPER.
ICE CREAM CONE DISPENSING MACHINE.
APPLICATION FILED OCT. 8, 1917.
1,289,907.
Patented Dec. 31, 1918.
7 SHEETS—SHEET 7.
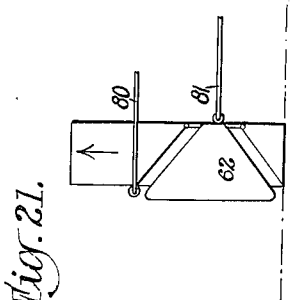
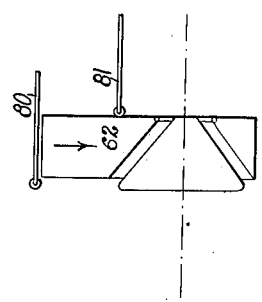
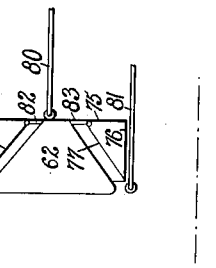
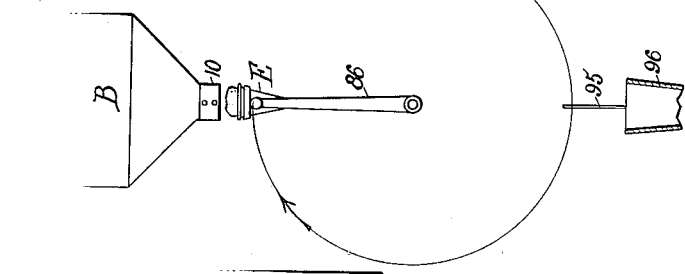
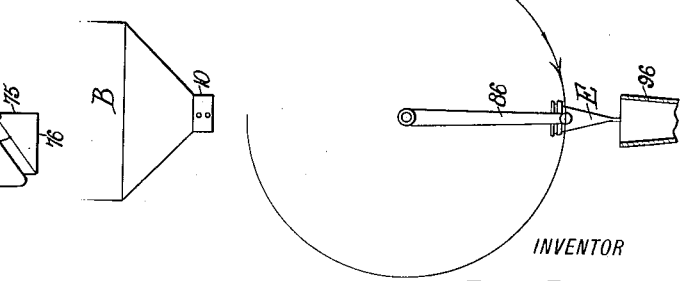
WITNESSES
Frederick Diehl.
C. Bradway
INVENTOR
R. H. Proper.
BY
ATTORNEYS

UNITED STATES PATENT OFFICE.

RUSSELL HENRY PROPER, OF NEW YORK, N. Y.

ICE-CREAM-CONE-DISPENSING MACHINE.

1,289,907.

Specification of Letters Patent.  Patented Dec. 31, 1918.

Application filed October 8, 1917. Serial No. 195,403.

*To all whom it may concern:*

Be it known that I, RUSSELL H. PROPER, a citizen of the United States, and a resident of the city of New York, borough of Manhattan, in the county and State of New York, have invented a new and Improved Ice-Cream-Cone-Dispensing Machine, of which the following is a full, clear, and exact description.

This invention relates to a coin-controlled dispensing machine especially designed for delivering ice cream in an edible cone holder and hereinafter the article dispensed will be termed an "ice cream cone."

The invention has for its general objects to provide a novel, reliable and simply-operated ice cream cone dispenser which automatically feeds an empty cone to an ice cream delivery spout and after the ice cream is deposited into the cone the latter is conveyed to a discharge spout.

A more specific object of the invention is the provision of an ice cream holder with the novel means for feeding ice cream by the turning of a crank or handle which is connected with a plunger to force the ice cream to the discharge spout, the operating means for the plunger being automatically disconnected when a pressure responsive device is affected by the pressure of the ice cream when a sufficient quantity has been fed, so that an overcharge of ice cream will not be delivered while the cone carrier is still moving by the turning of the operating crank.

Another object of the invention is the provision of a simple, novel and efficient charge measuring device whereby a definite quantity of ice cream is delivered each time, the said device being arranged at the discharge spout or mouth of the ice cream holder and composed of oppositely-acting gates and a scraper, the upper gate being closed while the lower gate is open, so that the ice cream charge can drop into a cone placed below the spout or hopper.

The invention has as a further object a novel means for successively feeding the empty cones from a magazine or holder to a swinging carrier which has holding jaws so arranged that the cone is alway held during its travel with the point down, the jaws being automatically opened when the carrier reaches the discharge chute of the machine.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a front view of the ice cream cone dispensing machine;

Fig. 2 is a vertical section somewhat enlarged, the section being taken on a plane indicated by the line 2—2, Fig. 1;

Fig. 3 is an enlarged sectional view of the operating shaft and associated parts;

Figure 15:
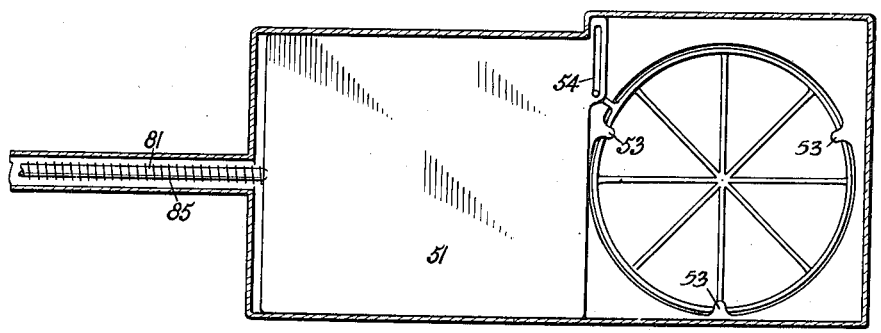
Figure 16:
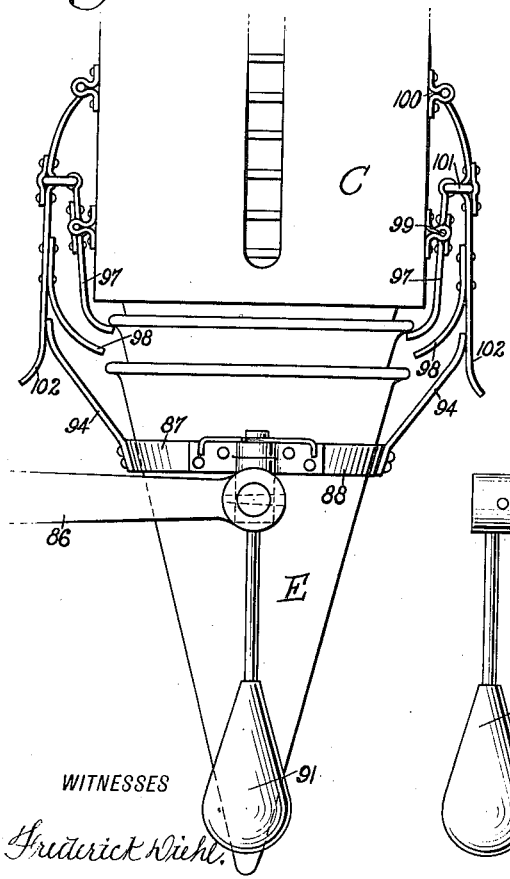
Figure 17:
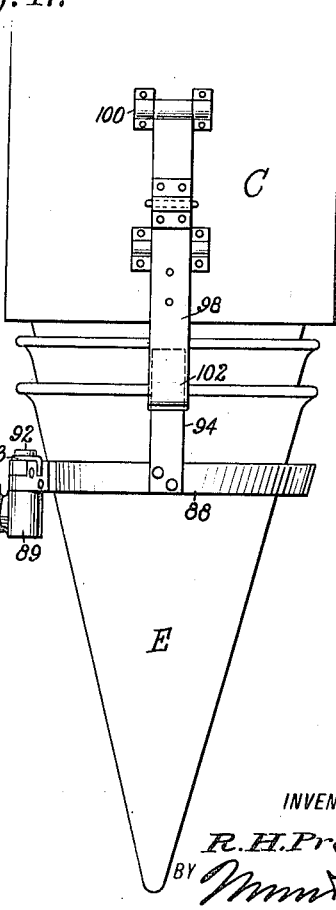

Figs. 4, 5 and 6 are transverse sections taken respectively on the lines 4—4, 5—5 and 6—6, Fig. 3;

Fig. 7 is a detail view showing the switch or cam plate for operating the gates or valves of the charge measuring device;

Fig. 8 is an edge view of this device;

Fig. 9 is a plan view of the cone-carrying jaws and the discharge chute, a cone being shown held by the jaws;

Fig. 10 is a side view of the parts shown in Fig. 9 just prior to the jaws being opened to drop a filled cone;

Fig. 11 is a vertical sectional view on the line 11—11, Fig. 9;

Fig. 12 is a horizontal section on the line 12—12, Fig. 11;

Fig. 13 is a detail sectional view of the discharge spout or mouth of the ice cream container with the valves in normal position;

Fig. 14 is a perspective view of the rotary scraper in the discharging mouth of the ice cream container;

Fig. 15 is a horizontal section on the line 15—15, Fig. 13;

Figs. 16 and 17 are side views of the empty cone-feeding device;

Figs. 18, 19, 20 and 21 inclusive are diagrammatic views showing the cone carrier in different positions with respect to the ice cream container and also the corresponding positions of the gates or valves for the discharge mouth of the container; and Fig. 22 is a sectional view showing the gear nut which moves the screw of the plunger that feeds the ice cream.

Fig. 23 is a diagrammatic view of the valve-actuating cam plate and the paths of the rollers of the valves with respect to the cam plate.

Referring to the drawing, A designates a cabinet or casing of any desired construction which has an operating crank 1 adjacent its top to be moved in a clockwise direction for the purpose of discharging at the dispensing opening or station 2 an ice cream cone after a coin is first dropped in the coin slot. The top of the cabinet may be provided with a removable or hinged cover 4 to permit the ice cream container B and the cone magazine C to be filled with ice cream and cones respectively.

The means for holding the ice cream comprises a tank 5, suitably supported in the upper portion of the cabinet, in which cracked ice 6 is packed around the receptacle B which holds the ice cream 7, there being a drain pipe 8 connected with the bottom of the tank 5 and leading to a basin 9 in the bottom of the cabinet so as to collect the draining brine. The receptacle B has a discharge spout or mouth 10 at its bottom into which ice cream is forced by a plunger 11 in the top of the receptacle or can B. This plunger is connected by a swivel 12 with the lower end of a screw 13 which rotates in a bearing 14 carried by a yoke 15 which is fastened to the top of the tank 5, there being a split nut 16 on the screw, which nut has bevel gear teeth 17 that mesh with a bevel gear 18 on a horizontal shaft 19 carried by the yoke 15. The top of the container is closed by a cover 20. By removing the yoke the plunger, cover, screw and associated parts can be taken off as a unit so that the receptacle B can be cleaned or refilled.

The shaft 19 can only be operated by the crank 1 after a coin has been dropped into the slot 3. The coin passes down the two sections 21 and 22 of the coin chute and drops out of the lower end of the chute section 22 into a cup 23 which is carried by a detent 24, as clearly shown in Fig. 3. At the juncture between the sections 21 and 22 of the coin chute is a magnet 25 for preventing iron or magnetic slugs from rendering the machine operative. The detent 24 is pivoted at 26 on a sleeve 27 which is connected by a pin 28 with the short shaft 29 to which the crank 1 is connected. The sleeve 27 has a slot 30 which registers with a slot 31 in the operating shaft 32, and when a coin enters the coin pocket 23 the portion 33 of the detent 24 acts as a key for locking the sleeve 27 and shaft 32 together, whereby the latter turns with the operating crank 1. Normally the parts are in the position shown in Fig. 3 (except that the crank 1 will be horizontal) and the crank 1 can be freely turned without operating the shaft 32. Connected with the crank shaft 29 is a spring 35 which holds the crank in the normal position shown in Fig. 1, that is to say, against a stop 36. As the shafts 29 and 32 turn together the detent is held in engaged position by passing under a ring-like guide or rail 37 surrounding and concentric with the sleeve 27. Normally a light spring 38 holds the detent in raised or disengaged position. The shaft 32 is connected with the shaft 19 by an arm 39, a pawl 40 thereon, and a ratchet wheel 41 on the shaft 19. This pawl and ratchet wheel permits the plunger operating shaft 19 to turn in only one direction. The pawl 40 is connected with a rock shaft 42 carried in the arm 39, and on this shaft is a throw-out member 43 that is adapted to be engaged by a cam 44 so as to throw out the pawl 40 when the ice cream feeding plunger 11 has forced out a charge of ice cream. The movement of the cam is effected by a pressure responsive device hereinafter to be described, and normally the cam is held to the left or in inoperative position, as shown in Fig. 3, by a coil spring 45 interposed between the hub of the arm 39 and the cam 44. Keyed to the shaft 32 is a mutilated toothed element 46 with which meshes a pawl 47 swinging on a fixed pivot 48 carried by the bearing 49 of the shaft 32. This toothed element 46 and pawl 47 constitutes a full stroke device so as to compel the operating crank to be moved through its complete stroke.

At the discharge mouth or spout 10 of the ice cream container B are arranged upper and lower slide valves or gates 50 and 51 which are so actuated that one is closed while the other is open. The lower valve 51 is in closed position while the plunger 11 forces ice cream downwardly, and after the mouth 10 is filled with a charge of ice cream the upper valve 50 is moved closed to thereby cut the charge in the mouth 10 from the mass in the container. The valve 51 is then opened so that the ice cream can drop into a cone E placed under the mouth 10. A cage-like scraper 52, constructed as shown in Fig. 14, is arranged in the mouth 10 and is caused to oscillate so as to scrape the ice cream from the walls of the mouth. This scraper is supported on lugs or equivalent bearings 53, as shown in Fig. 15, and it has a slot and pin connection 54 with the lower valve 51, so that when the latter moves closed the scraper is operated to release the ice cream from the surrounding wall. In the mouth 10 is a pressure responsive device in the form of a plunger 55 which is guided in a tube 56 and has a stem 57 which is connected at 58 with the lower end of a lever 59, such lever being fulcrumed at 60, as shown in Fig. 2, and its upper end 61 engages the cam 44. When the valve or gate 51 is closed and the plunger 11 moves downwardly, cream is compressed in the spout or mouth 10 and the pressure of the ice cream on the follower 55 causes the latter to move outwardly, so that the lever 59 is oscillated in a direction to throw the cam 41 into engagement with the finger 43, whereby the pawl 40 is thrown out of engagement with the ratchet wheel 41, and consequently the follower 11 is disconnected from the operating crank, which may occur at a time while the operating crank must still be moved to carry the ice cream cone to the position to receive the charge when the lower valve opens.

The valves or gates 50 and 51 are operated by a sliding cam plate 62 carried by rods 63 which move in guide brackets 64 on the front wall of the casing, the cam plate being connected by a connecting rod 65 with a crank 66 on a countershaft 67 that is journaled in a bearing bracket 68, and on the shaft is a crank 69 that is connected by a rod 70 with the crank arm 39. The cam plate has two tracks, one being formed by the surfaces 71, 72, 73 and 74 and the other by the surfaces 75, 76, 77 and 71, and these tracks are engaged by rollers 78 and 79 on rods 80 and 81 connected with the valves 50 and 51, respectively. The cam plate reciprocates and the valve rods 80 and 81 are caused to reciprocate in a direction at right-angles to the movement of the cam plate, whereby one valve is opened while the other valve is closed. As the surfaces 71 and 75 are in a common plane, self closing gates 82 and 83 are provided at the angles between the surfaces 71 and 74 and the surfaces 75 and 77, which permits the rollers 78 to move downwardly along and off the surface 74 and upwardly along and off the surface 77. Springs 84 and 85 act on the rods 80 and 81 and coöperate with the cam plate to cause the valves 50 and 51 to reciprocate. In Figs. 18 to 21 the relative positions of the cam plate and valves are indicated, it being understood that the various track surfaces of the cam plate are so proportioned that the valves 50 and 51 will open and close in proper sequence. In Fig. 23 it is assumed that the cam plate is stationary and that the rollers 78 and 79 can move up and down as well as back and forth horizontally, and in this case the path followed by the roller 78 is indicated by the arrows $a$ and the path traveled by the roller 79 is indicated by the arrows $b$. In Fig. 2 the cam 62 is shown at the bottom of its downward stroke and not in its normal position.

The cone carrier which carries a cone from the magazine C to the discharge spout 10 of the ice cream container is in the form of an arm 86 arranged on the end of the lower shaft 67, and this arm carries a pair of approximately semi-circular jaws 87 and 88 mounted on the head 89 of a pivot pin or rotatable element 90 journaled horizontally in the extremity of the arm 86, as clearly shown in Figs. 11, 12, 16 and 17. On the pivot pin 90 is a pendulum 91 which maintains the jaws 87 and 88 always in a horizontal plane during the swinging movement of the arm 86. The jaw 88 swings on a vertical pivot 92 and is normally held in gripping position by a spring 93. The extremity of the movable jaw 88 is adapted to strike a stop 95 on the cone discharge chute 96 arranged adjacent the dispensing opening 2, so that when the filled cone is carried by the arm 86 downwardly, the stop 95 engages the extremity of the jaw 88 and opens the latter, so that the cone can drop into the chute 96. The cone-carrying arm 86 is adapted to swing through two hundred and seventy degrees, as will be apparent from Figs. 18 to 21 inclusive. In Fig. 21 the arm 86 is in a position to receive a cone from the chute C, and then the arm 86 moves in a clockwise direction, the stop 95 yielding as the jaw 88 passes it at the end of the first ninety degrees of travel. The arm 86 then travels upwardly to a point under the discharge mouth 10 of the ice cream holder. At this point the charge of ice cream is dropped out of the mouth or spout 10 and then the operating crank is turned in the opposite direction from the position shown in Fig. 19 to the position shown in Fig. 20, where the stop 95 causes the jaw 88 to open and drop the ice cream cone. The arm 86 continues on its return stroke and comes to rest in a position shown in Fig. 21, where another ice cream cone is picked up.

By reference to Figs. 16 and 17 it will be observed that the ice cream cones are arranged in nested relation in the chute C, and at the lower end of the chute are two pairs of fingers or gripping elements 97 and 98 which are fulcrumed respectively at 99 and 100 on the chute, the jaws of each pair being disposed at opposite sides of the chute so as to grip the cones E at opposite points. The jaws 97 and 98 at each side of the chute are connected together by a link 101 so that when one jaw opens the other closes, or vice versa. The lower or gripping ends of the jaws 98 are disposed below the gripping ends of the jaws 97, so that when the jaws 98 move outwardly to drop a cone, the jaws 97 will move inwardly to grip the same, or vice versa. The operation of the jaws is effected by the upstanding fingers 94 on the carrier jaws 87 and 88, which fingers engage extensions 102 projecting downwardly from the jaws 98. When the carrier moves upwardly toward the chute C the fingers 94 have a wiping engagement on the extensions 102 and move the jaws 98 outwardly so as to release the lowermost cone E, which drops into the carrier jaws 87 and 88. The gripping members or jaws 97 simultaneously move inwardly and engage the next cone and thereby support the column of cones in the magazine C. As the carrier arm 86 moves downwardly the fingers 94 disengage the extensions 102, so that the jaws 97 will move outwardly and the jaws 98 move inwardly to support the column of cones. The jaws 98 remain in gripping relation during the entire swinging movement of the carrier arm 86, and upon the return of the latter to normal position the gripping members or jaws 97 and 98 are again operated to deliver an empty cone from the magazine.

When the crank is turned after a coin has been dropped into the slot, the coin-holding cup turns with the crank shaft and deposits the coin into a receptacle $r$, Fig. 2, but the detent 24 is held in engaged position by reason of the retaining member 37, until the parts come back to their normal position, when the detent raises or disengages the slot 31, since the weight of a coin no longer holds the detent depressed.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. An ice cream cone conveying machine comprising an ice cream holder, a pair of valves operated to deliver a charge of ice cream from the holder, means in the holder for forcing the ice cream toward the valves, and means operated in timed relation to the valves for carrying a cone to the said holder to receive a charge of ice cream therefrom.

2. An ice cream cone conveying machine comprising an ice cream holder, a pair of valves operated to deliver a charge of ice cream from the holder, means in the holder for forcing the ice cream toward the valves, a magazine for holding cones, a swinging carrier for conveying a cone from the magazine to the said holder for receiving a charge of ice cream, and a dispensing chute to which the carrier conveys the filled cone.

3. An ice cream conveying machine comprising an ice cream holder having a discharge spout, valve means controlling the discharge of ice cream from the spout, a device for forcing the ice cream to the spout, a magazine for holding ice cream cones, a carrier for conveying a cone from the magazine to the said spout, a dispensing chute to which the carrier delivers a filled cone, and cone-feeding means at the said magazine operated automatically by the said carrier.

4. An ice cream conveying machine comprising an ice cream holder having a discharge spout, valve means controlling the discharge of ice cream from the spout, a device for forcing the ice cream to the spout, a magazine for holding ice cream cones, a carrier for conveying a cone from the magazine to the said spout, a dispensing chute to which the carrier delivers a filled cone, cone-feeding means at the said magazine operated automatically by the said carrier, said carrier having cone-gripping jaws, and means connected with the jaws for maintaining the same in a horizontal plane throughout the range of travel of the carrier.

5. An ice cream cone vending machine comprising a holder for ice cream, a discharge mouth therefor, reciprocatory spaced valves at the mouth for delivering a charge of ice cream, a scraper in the mouth, and means for operating the valves and scraper.

6. An ice cream vending machine comprising a container for ice cream, a discharge spout, reciprocatory valves controlling the feed of ice cream from the spout, operating means connected with the valves for opening one while the other is closed, a rotary scraper in the spout, and means for actuating the scraper.

7. An ice cream vending machine comprising a container for ice cream, a discharge spout, reciprocatory valves controlling the feed of ice cream from the spout, operating means connected with the valves for opening one while the other is closed, a rotary scraper in the spout, and a connection between the scraper and one of the valves for operating the scraper by the latter.

8. An ice cream vending machine comprising a container for the ice cream having a discharge spout, means controlling the discharge of ice cream from the spout, a device for forcing the ice cream to the spout, operating means for the said device, and a pressure responsive means in the spout for rendering the operating means inoperative.

9. An ice cream bending machine including a container for the ice cream, a spout for the container, means controlling the feed from the spout in charges, a plunger in the container for forcing the ice cream to the spout, an operating means for the plunger including normally engaged parts, and a pressure responsive device actuated by the pressure of the ice cream in the spout for disengaging the said parts when the plunger has produced a predetermined pressure.

10. An ice cream vending machine including a container having a discharge means for the ice cream, a plunger exerting pressure on the ice cream, feeding means through which the ice cream is forced, an operating screw connected with the plunger, a nut for moving the screw, an operating means for turning the screw, said means including a revolving pawl and a toothed wheel driven thereby, and means located at the said discharge means and responsive to the pressure of the ice cream fed from the container and connected with the pawl for throwing the same out of engagement with the toothed wheel.

11. An ice cream vending machine including a container having a discharge means for the ice cream, a plunger exerting pressure on the ice cream, feeding means through which the ice cream is forced, an operating screw connected with the plunger, a nut for moving the screw, an operating means for turning the screw, said means including a revolving pawl and a toothed wheel driven thereby, a member located at the discharge means and moved by the pressure of the ice cream, a lever operated by the member, a cam actuated by the lever, and a finger connected with the pawl and engaged by the cam for disengaging the pawl when the plunger exerts a predetermined pressure on the ice cream.

12. An ice cream vending machine including a container for the ice cream, a discharge spout, spaced valves in the spout for controlling the delivery of ice cream in separate charges, means for operating the valves whereby one will be opened while the other is closed, a rotary scraper between the valves, means for actuating the scraper, a plunger in the container for forcing the ice cream to the spout, actuating means for the plunger, said means including normally engaged parts, and a pressure responsive device arranged in the spout at a point between the valves and arranged to disengage the said parts when the plunger exerts a predetermined pressure.

13. An ice cream vending machine including an ice cream container, means for feeding ice cream in separate charges therefrom, a magazine for holding cones, a set of gripping elements at the bottom of the magazine, another set of gripping elements disposed below the first, means linking corresponding gripping elements of the sets together to move one set inwardly while the other set moves outwardly, whereby one set engages a cone while the other set disengages a cone, and a cone conveyer movable to and from the magazine, and having means for operating the said elements.

14. An ice cream cone vending machine comprising a holder for the ice cream and having a discharge spout, a magazine for containing cones having its discharge end disposed below and to one side of the discharge spout of the said holder, a dispensing station for the ice cream cone located under the said spout and below the discharge end of the magazine, and a rotary conveyer mounted between the said spout and dispensing station and movable from the magazine to the said spout to receive a charge of ice cream, and thence to the said dispensing station.

15. An ice cream cone vending machine comprising a holder for the ice cream and having a discharge spout, a magazine for containing cones having its discharge end disposed below and to one side of the discharge spout of the said holder, a dispensing station for the ice cream cone located under the said spout and below the discharge end of the magazine, a swinging conveyer mounted on an axis located between the spout and dispensing station and having means for receiving a cone from the magazine and conveying it past the dispensing station to the spout to receive a charge of ice cream and thereafter back again to the dispensing station, means for releasing the filled cone from the conveyer at the dispensing station, and means for operating the conveyer.

RUSSELL HENRY PROPER.